March 11, 1924.

E. A. G. STREET

ELECTRIC BATTERY

Filed June 30, 1922

1,486,613

Inventor
E.A.G. Street
By Marks&Clerk
Attys

Patented Mar. 11, 1924.

1,486,613

UNITED STATES PATENT OFFICE.

ERNEST AUGUSTE GEORGE STREET, OF LEVALLOIS-PERRET, FRANCE, ASSIGNOR TO SOCIÉTÉ ANONYME LE CARBONE, OF LEVALLOIS-PERRET, FRANCE.

ELECTRIC BATTERY.

Application filed June 30, 1922. Serial No. 571,940½.

*To all whom it may concern:*

Be it known that I, ERNEST AUGUSTE GEORGE STREET, of 12 and 33 Rue de Lorraine, Levallois-Perret, Seine, in the Republic of France, have invented Electric Batteries, of which the following is a full, clear, and exact description.

This invention has for its object to furnish a type of electric battery capable of concentrating and localizing the precipitates and insoluble products formed in the course of its operation.

This localized concentration does away with the crystallizations and sediments which are formed in the ordinary batteries and hinder the proper circulation of the electrolyte. By doing away with these crystallizations and sediments, the action of the electrolyte is more complete and the efficiency of the battery is thus increased.

The type of electric battery forming the subject matter of this invention, moreover, effects, in the course of its operation, the regeneration of the electrolyte.

This type of battery is essentially characterized by the special constitution of its positive electrode.

This positive electrode substantially comprises:

(*a*) A porous body which is a conductor of electricity, for instance an agglomerate of charcoal, capable of adsorbing or of absorbing the gases generated by the chemical reactions produced in the element.

(*b*) A carbon stick (which is a good conductor of electricity passing through the conducting porous body) extending above and below the latter, the upper free end of this conducting carbon stick being exposed to the atmosphere and its lower end extending downwardly almost to the bottom of the vessel containing the electrolyte.

(*c*) A coating of colloidal or gelatinous material covering the surface of the portion of the porous body immersed in the electrolyte, this coating being adapted to prevent the access of water into the pores of the porous body without however checking the passage of the reaction gases.

The portion of the conducting carbon stick extending below the porous body and immersed in the electrolyte is also covered on a portion of its height with a colloidal or gelatinous coating or with an insulating coating, the lower end of the stick being then coated, so as to be in direct contact with the electrolyte.

The negative electrode is constituted by zinc or other metal suitable for the electrolyte used.

In this type of battery, the precipitated or insoluble products which are formed in the course of its operation collect on the lower end of the conducting carbon stick in electric contact with the electrolyte.

In order that the invention may be clearly understood it will be described hereafter, by way of example, in the case of its application to a battery, the exciting liquid of which is chlorhydrate of ammonia, reference being had to the accompanying drawing in which.

Figure 1:
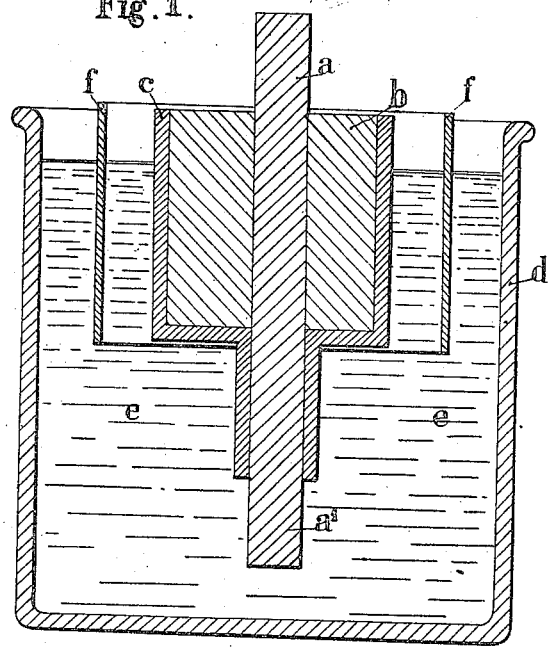
Fig. 1 is a vertical sectional view of one form of the battery.

In the battery illustrated in Fig. 1, the positive electrode comprises a central carbon stick $a$, which is a good conductor of electricity, and carries a conducting porous body $b$ constituted, for instance, by an agglomerate of charcoal. The height of this body is smaller than that of the conducting carbon stick $a$ and the latter extends above and below the porous body $b$.

The upper free end of the central carbon stick $a$ and the upper part of the porous body $b$ extend above the electrolyte $e$ so as to be in contact with the atmosphere.

A coating $c$ of colloidal material, similar to the jelly generally used as fixing agent in dry batteries, covers all the surface of the porous body $b$, capable of being in contact with the electrolyte and covers also, on a portion of its height, the part of the central carbon stick $a$ immersed in the electrolyte, as shown in Fig. 1. This coating terminates at a certain distance from the lower end of this portion of the carbon stick $a$ so that the end $a^1$ of the latter remains bare and is in direct contact with the electrolyte.

The lower free end of the conducting carbon stick $a$ extends downwardly within a short distance of the bottom of the vessel $d$ containing the electrolyte $e$, which is constituted by chlorhydrate of ammonia in the example described, as above stated.

The negative electrode is constituted in the ordinary manner, for instance by a cylindrical strip of zinc $f$.

The electrodes are supported by any suitable device.

During the normal operation of the battery, the zinc is attacked in the usual way by the chlorhydrate of ammonia; zinc chloride is formed and ammonia and hydrogen are evolved, the zinc chloride tending, by gravity, to collect at the bottom of the vessel $d$, whilst the ammonia and hydrogen pass through the colloidal coating $c$ and are absorbed by the porous body $b$.

In these conditions, the central conducting carbon stick $a$ has its lower end in direct contact with a solution containing zinc chloride and its portion in contact with the porous body $b$, in an ammoniacal medium. An electric couple is thus formed, which is short-circuited through the central carbon stick $a$ and the electrolyte. This couple decomposes the zinc chloride, forming chlorhydrate of ammonia which thus regenerates the electrolyte and precipitates the zinc, thus set free, on the lower end $a^1$ of the central carbon stick $a$.

Figure 2:
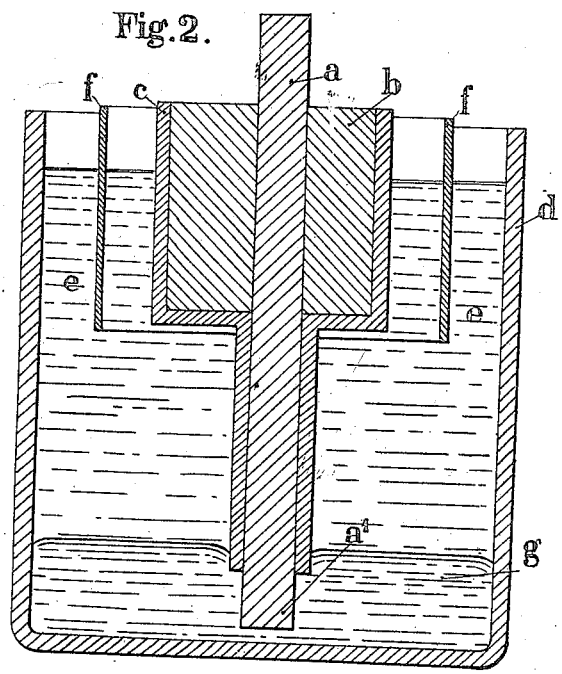
Fig. 2 is a similar view of a modification.

Fig. 2 shows a modification in which the central conducting carbon stick $a$ is completely out of contact with the electrolyte and is immersed in mercury $g$ with which its lower end $a^1$ is in electric contact. In this case, the insoluble materials contained in the electrolyte or the precipitates formed collect by means of the electric couple formed as above stated, at the surface of the mercury and there totally or partially dissolve.

The present invention gives therefore the following results:

1. The concentration and localization of the insoluble products and precipitates formed in the course of the operation of the battery.

2. The regeneration of the electrolyte.

It is to be understood that the two methods of construction above described are given by way of example only and that the form, dimensions and nature of the elements constituting the present type of battery may be varied according to the applications.

Batteries with fixed liquid might also be realized, in accordance with the present invention, by the means currently used.

Claims:—

1. An electric battery capable of localizing and concentrating the precipitates or insoluble products formed in the course of its operation and also capable of regenerating its electrolyte comprising a vessel containing an electrolyte, a positive electrode including a conducting porous body, a central conducting carbon stick extending through the porous body and having one of its ends exposed to the atmosphere and its other end located in close proximity to the bottom of said vessel, said porous body having its lower portion extending into said electrolyte, a coating of colloidal material covering the surface of the portion of the porous body immersed in the electrolyte and also covering the portion of the carbon stick extending below the porous body, on a portion of the height of said stick, the lower end of said stick being uncoated and being in electric contact with the electrolyte, and a negative electrode extending into said electrolyte, the whole combined in such a manner that the precipitates and insoluble products formed in the course of the operation of the battery collect on the lower end of the carbon stick.

2. A battery as claimed in claim 1 in which the porous body consists of an agglomerate of charcoal.

3. A battery as claimed in claim 1 in which the negative electrode is of annular form and surrounds the porous body.

4. A battery as claimed in claim 1 including a layer of mercury arranged in the lower portion of said vessel below the electrolyte and contacting directly with the lower end of the carbon stick.

5. An electric battery including a vessel containing a layer of mercury, an electrolyte arranged in the vessel above the mercury, a carbon stick having its lower end submerged in said mercury and its upper end extending above the electrolyte and exposed to the atmosphere, a porous body surrounding said stick and partially submerged in said electrolyte, a coating of colloidal material surrounding the submerged portion of the porous body and the portion of said stick which extends between the porous body and the mercury, and an annular negative electrode partially submerged in the electrolyte and surrounding the porous body.

The foregoing specification of my electric battery with localized concentration of the precipitates or insoluble products formed in the course of its operation with regeneration of the electrolyte, signed by me this day of June, 1922.

ERNEST AUGUSTE GEORGE STREET.